United States Patent Office 3,532,789
Patented Oct. 6, 1970

3,532,789
HALOGENATED FLUORESCEIN COMPOSITIONS AND PROCESS
Paul A. Thomasset, New York, N.Y., assignor to Sterling Drug Inc., New York, N.Y., a corporation of Delaware
No Drawing. Filed Jan. 19, 1966, Ser. No. 521,496
Int. Cl. A61k 7/02
U.S. Cl. 424—64         1 Claim

ABSTRACT OF THE DISCLOSURE

Lipstick-coloring compositions having improved staining and solubility properties are obtained by co-precipitating 2,4,5,7-tetrabromofluorescein with at least 15 percent by weight of other halogenated fluorescein dyes.

---

This invention relates to improvements in dyestuffs, particularly those classified in the art of chemistry as coal tar dyes of the xanthene family. More particularly, the invention pertains to fluorescein dye compositions having improved staining and solubility characteristics for use in cosmetics, and to processes for preparing said improved compositions.

The halogenated fluoresceins are water-insoluble dyestuffs which have the property of reacting with mucous membranes in such a way as to impart an indelible stain; hence they are widely employed as coloring agents for lipsticks. A particularly valuable dye of this class is 2,4,5,7-tetrabromofluorescein which is sold under Food and Drug Administration certification as D&C Red No. 21. To be used as a cosmetic color, tetrabromofluorescein must fall within rigid standards of purity; that is, the content of each of the other brominated fluoresceins, formed during the synthesis of tetrabromofluorescein, must be below a certain prescribed maximum. Unfortunately, the very impurities which are rigidly controlled for reasons of health, also act to increase the usefulness of the dye by their presence, because the impurities tend to make the resulting dye more soluble in lipstick base and to increase the speed of the membrane-staining reaction.

To compensate for the poorer solubility of the purified D&C Red No. 21, various solvents have been added to lipstick bases. However, most of the solvents employed suffer such disadvantages as toxicity, low compatibility with other ingredients, low solvency power for the dyes, and high volatility which results in crumbling of the lipstick.

It is an object of this invention to provide dye compositions, adapted for use in cosmetics such as lipsticks, which have improved solubility in lipstick bases.

It is another object of this invention to provide dye compositions, adapted for use in cosmetics such as lipsticks, which have improved staining characteristics when applied to mucous membranes.

It is a further object of this invention to provide a method for preparing improved dye compositions for use in cosmetics such as lipsticks which have improved solubility and staining characteristics.

The particular objects set forth are attained by the invention herein described as follows.

In one of its aspects, the instant invention is described as residing in the concept of a lipstick-coloring composition, having improved staining and solubility characteristics which comprises a homogeneous, co-precipitated mixture consisting of from 15 to 85 percent of 2,4,5,7-tetrabromofluorescein and from 85 to 15 percent of other halogenated fluorescein dyes. The other halogenated fluorescein dyes for use in admixture with 2,4,5,7-tetrabromofluorescein are preferably certified colors themselves in order that the mixtures obtained shall comply with regulations of the Food and Drug Administration for use in lipsticks. Suitable certified halogenated fluoresceins include, for example, D&C Orange No. 5 (a mixture of 4,5-dibromofluorescein and 2,4,5-tribromofluorescein along with smaller quantities of other brominated fluoresceins), D&C Orange No. 10 (a mixture of 4,5-diiodofluorescein and 2,4,5-triiodofluorecein along with smaller quantities of other iodinated fluorescein), FD&C Red No. 3 (2,4,5,7-tetraiodofluorescein) and D&C Red No. 27 (2,4,5,7-tetrabromo 2',3',4',5-tertachlorofluorescein).

In another of its aspects, the instant invention resides in the concept of a process for preparing a lipstick-coloring composition having improved staining and solubility characteristics are described herein, which comprises acidifying an aqueous alkaline solution containing from 15 to 85 percent of 2,4,5,7-tetrabromofluorescein and from 85 to 15 percent of other halogenated fluoresceins as described.

In yet another of its aspects, the invention resides in the specific co-precipitated composition consisting of approximately 90 percent of D&C Red No. 21 (2,4,5,7-tetrabromofluorescein and approximately 10 percent of D&C Orange No. 5. This composition is particularly valuable for its rapid lip-staining properties, its high solubility in lipstick bases and its exceptional stability to heat. D&C Orange No. 5 consists essentially of approximately 50–60 percent 4,5-dibromofluorescein and 30–40 percent of 2,4,5-tribromofluorescein, along with small quantities of other brominated fluoresceins, including 2,4,5,7-tetrabromofluorescein, 4-bromofluorescein, 2,4-dibromofluorescein and 2,5-dibromofluorescein.

In the practice of my invention, tetrabromofluorescein and other halogenated fluoresceins are weighed out in the proper proportions to give the desired shade and are dissolved in a quantity of dilute aqueous alkali metal hydroxide solution to effect complete solution of the fluorescein compounds. The solution containing mixed fluoresceins is then acidified sufficiently to bring the pH to 3.5 or below, whereupon the halogenated fluorescein compounds are co-precipitated from the solution. The precipitate is filtered and washed free of salts and is dried.

The co-precipitated mixture obtained by the procedure described possesses enhanced staining and solubility characteristics not obtained in mixtures of the same fluorescein compounds prepared by mere physical blending of the dyes. The co-precipitated dyes have significantly faster staining properties when applied to mucous membranes such as the lips. Moreover, the co-precipitated dyes are significantly more soluble in the lipstick bases commonly used in the cosmetic art. Thus the novel compositions described, having superior properties which particularly adapt them to use in cosmetics, constitute a valuable contribution to the art.

Although the foregoing disclosure is limited to the use of my new coloring compositions in lipsticks, it will be obvious to one skilled in the art that the same can also be employed in preparing other colored cosmetics, for example, rouges and face powders.

The foregoing discussion and the following examples are presented to illustrate methods suitable for the practice of my invention, and not to limit its scope.

EXAMPLE 1

Twelve parts of D&C Orange No. 5 and 8 parts of D&C Red No. 21 were dissolved in 15 parts of 50 percent aqueous sodium hydroxide solution, and the resulting solution of mixed dyes was diluted with about 1000 parts of water. The solution was heated to about 45° C. and acidified to pH 2.5 slowly and with constant stirring with dilute phosphoric acid, prepared by diluting concentrated phosphoric acid with three times its volume of water. After acidification was complete, the mixture of precipitated colors was stirred for ten minutes and was filtered. The filter cake was washed thoroughly with acidified water at pH 2.5 and was dried.

The co-precipitated dye mixture was incorporated into lipsticks and compared with lipsticks in which there were incorporated D&C Orange No. 5 alone, D&C Red No. 21 alone, and physical mixtures of D&C Orange No. 5 and D&C Red No. 21 prepared by blending the dry colors. The tests showed that the co-precipitated mixture was more soluble in lipstick base, was stronger in color value, especially when applied to skin, and the color was more stable to prolonged exposure to heat.

EXAMPLE 2

Separate stock solutions of D&C Red No. 21 and D&C Orange No. 5 each having a pH of about 11 were prepared by dissolving 50 parts of the colors in 13.6 parts and 16.2 parts respectively of 50 percent sodium hydroxide solution. The following four mixtures were prepared from the stock solution:

| Mixture | Parts by weight of D&C Color | | | |
|---|---|---|---|---|
| | 1 | 2 | 3 | 4 |
| Color: | | | | |
| D&C Red No. 21 | 16 | 12 | 8 | 4 |
| D&C Orange No. 5 | 4 | 8 | 12 | 16 |
| D&C Red No. 21 (percent) | 80.0 | 66.6 | 33.3 | 20.0 |

The mixed solutions were diluted to 1000 parts with water and were acidified to pH 2.5 slowly with 50 percent hydrochloric acid. The precipitated mixtures were then stirred for ten minutes. The precipitates were filtered, washed with water acidified to pH 2.5 and dried.

The four mixtures were incorporated into lipstick bases to determine the effect of varying proportions of the dyes on the hue, stability and staining power. The tests showed that the hues of mixtures containing up to 66 percent of D&C Orange No. 5 were very slightly changed from that of D&C Red No. 21 alone. However, the staining power of all the mixtures was significantly greater than D&C Red No. 21 alone. There was also an increase in transparency of the color of mixtures containing up to about 66 percent D&C Orange No. 5. Moreover, all the above mixtures retained their staining strength after prolonged heating much better than did the individual dyes.

EXAMPLE 3

Five mixtures of dyes were prepared from quantities of D&C colors as follows:

| Mixture | Parts by weight of D&C Color | | | | |
|---|---|---|---|---|---|
| | 1 | 2 | 3 | 4 | 5 |
| Color: | | | | | |
| D&C Red No. 21 | 16 | 16 | 14 | 14 | 10 |
| D&C Red No. 3 | 2 | 4 | 0 | 2 | 0 |
| D&C Orange No. 10 | 0 | 0 | 0 | 4 | 0 |
| D&C Red No. 27 | 0 | 0 | 2 | 0 | 2 |
| D&C Orange No. 5 | 2 | 0 | 4 | 0 | 8 |

The mixtures of colors were each dissolved in 200 parts of water containing 2.5 parts of sodium hydroxide. The solution was diluted to 1500 ml. at 20° C. and was made acidic to pH 3.2 with hydrochloric acid. The precipitated mixture was stirred for 10 minutes. The mixture was divided in half. The first half (A) was filtered, and the color was washed thoroughly with water and dried. The second half (B) was made acidic to pH 2.5 with hydrochloric acid, and was stirred 10 minutes and filtered. The precipitated color was washed thoroughly with water and dried. Each of the ten dye mixtures was formulated in lipstick base and compared with 2,4,5,7-tetrabromofluorescein for hue, strength of stain, and quickness of stain.

The results of the comparisons show that any of the other fluoresceins increase the stain strength and speed of stain of 2,4,5,7-tetrabromofluorescein when co-precipitated therewith. The dyes precipitated at pH 2.5 in general showed a slightly stronger stain strength.

EXAMPLE 4

Following the procedure given in Example 1, an aqueous alkaline solution containing 45 parts of 2,4,5,7-tetrabromofluorescein and 5 parts of D&C Orange No. 5 in 500 parts of water containing 7.5 parts of sodium hydroxide. The dyes were co-precipitated by the addition of 20 parts of dilute hydrochloric acid. The precipitate was thoroughly washed and dried. The resulting mixture consisting of approximately 90 percent 2,4,5,7-tetrabromofluorescein and approximately 10 percent of D&C Orange No. 5 exhibited exceptionally valuable properties, for example, high heat stability, high solubility in lipstick base, and high staining power and rapid staining when applied to the lips.

I claim:
1. A lipstick-coloring composition having improved staining and solubility characteristics which comprises a homogeneous, co-precipitated mixture consisting of approximately 90 percent 2,4,5,7-tetrabromofluorescein and approximately 10 percent of D&C Orange No. 5.

References Cited

UNITED STATES PATENTS 3,111,528  11/1963  Langstroth _____ 260—335

ALBERT T. MEYERS, Primary Examiner

D. M. STEPHENS, Assistant Examiner